Aug. 31, 1943.  E. A. JONES  2,328,280
CONTROL MEANS AND SYSTEM OF CONTROL FOR HEATING DEVICES
Filed June 14, 1940  4 Sheets-Sheet 1
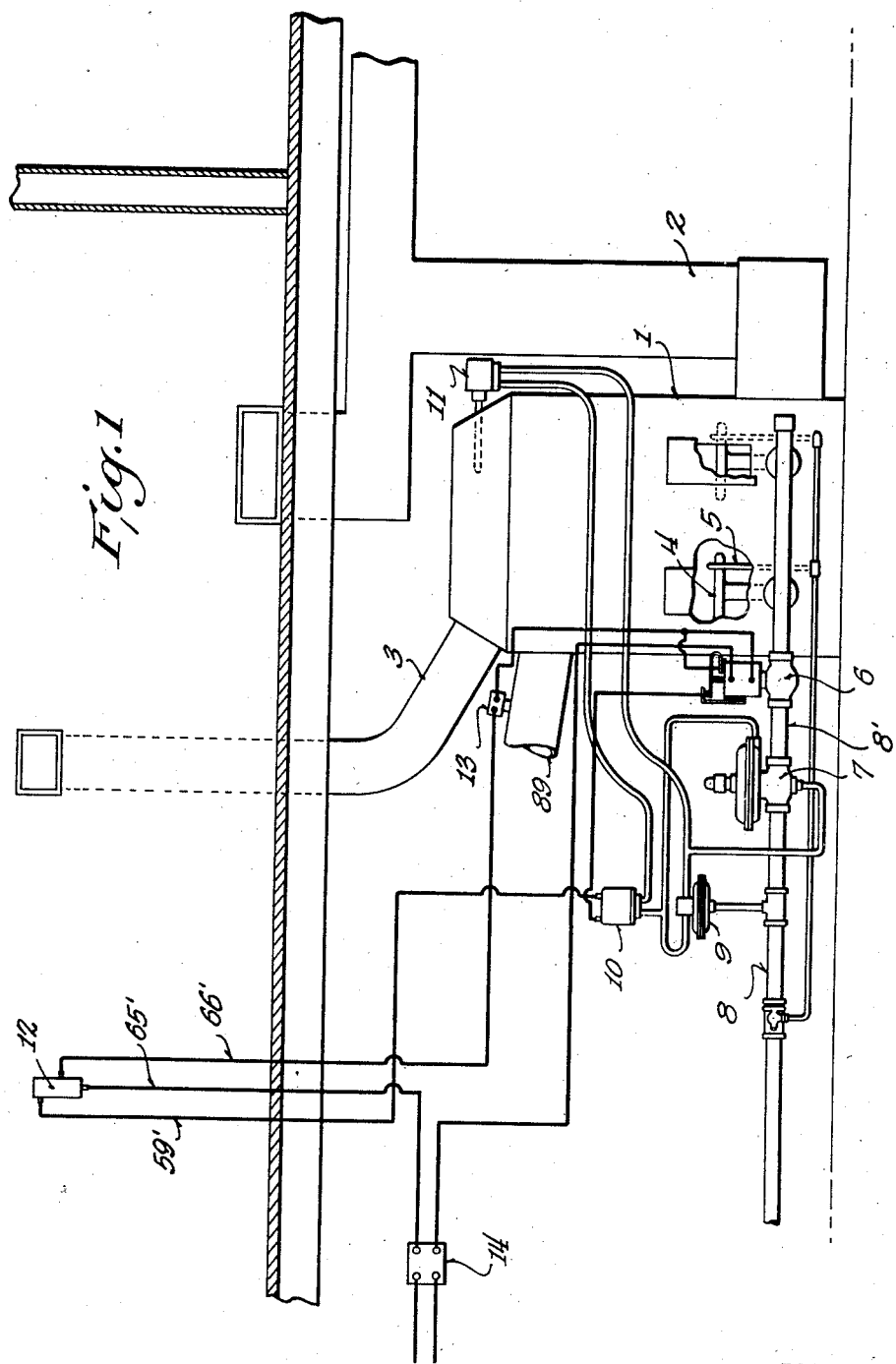
INVENTOR.
EDWIN A. JONES
BY
ATTORNEY.

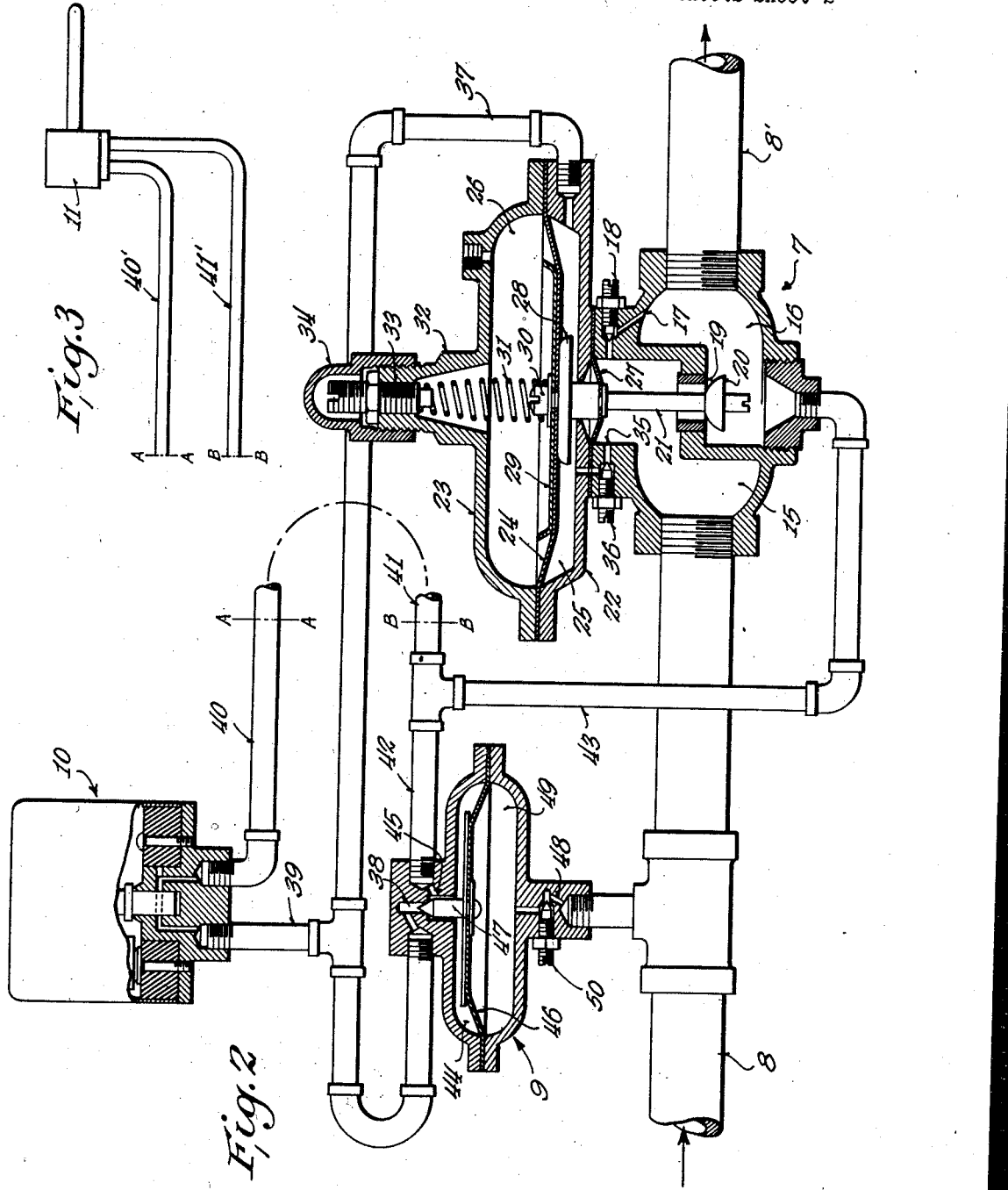

Aug. 31, 1943.  E. A. JONES  2,328,280
CONTROL MEANS AND SYSTEM OF CONTROL FOR HEATING DEVICES
Filed June 14, 1940  4 Sheets-Sheet 3
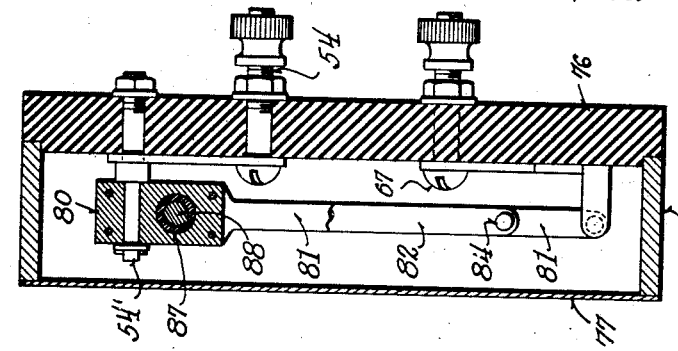
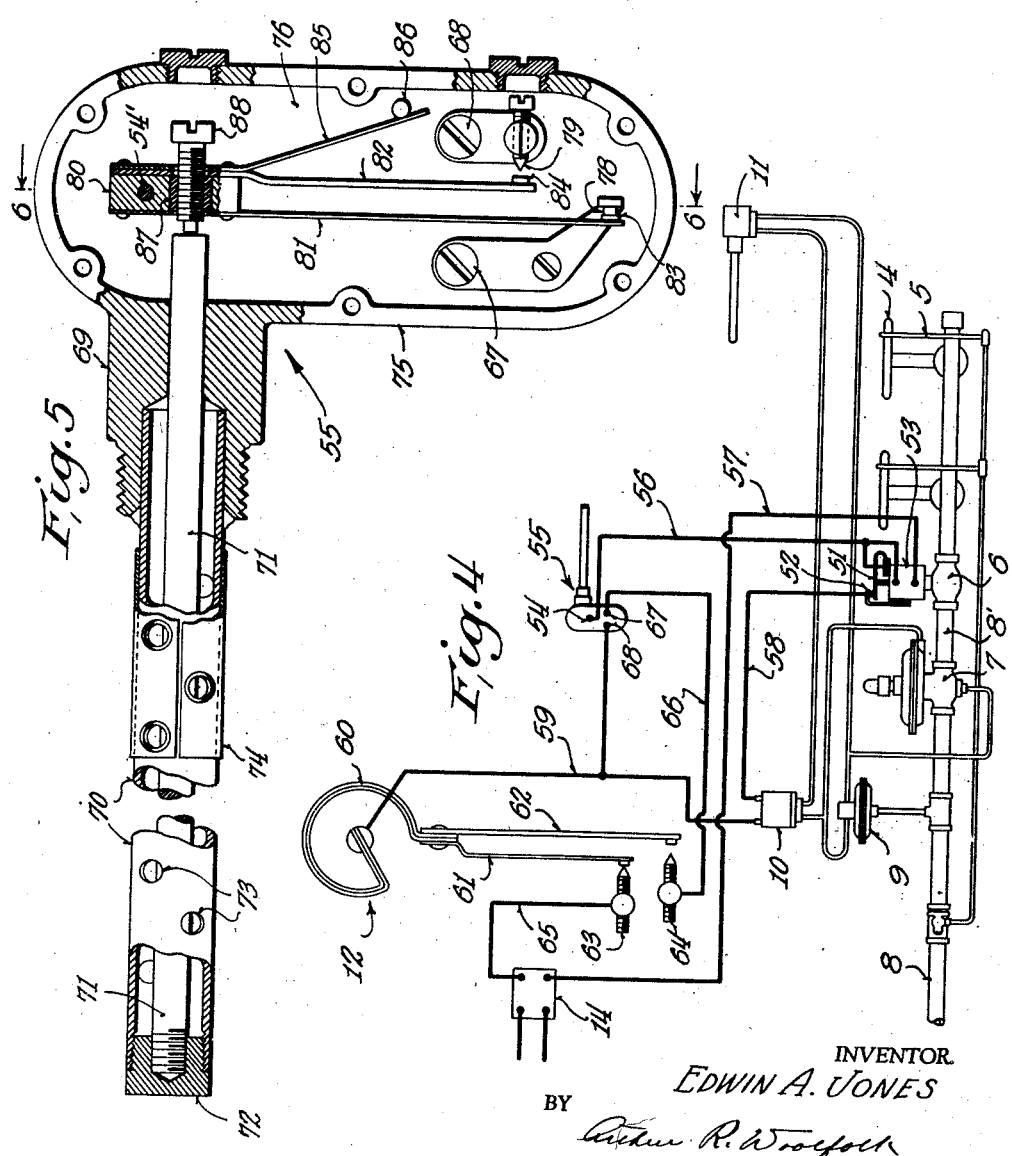
INVENTOR.
EDWIN A. JONES
BY
 ATTORNEY.

Aug. 31, 1943.  E. A. JONES  2,328,280
CONTROL MEANS AND SYSTEM OF CONTROL FOR HEATING DEVICES
Filed June 14, 1940   4 Sheets-Sheet 4
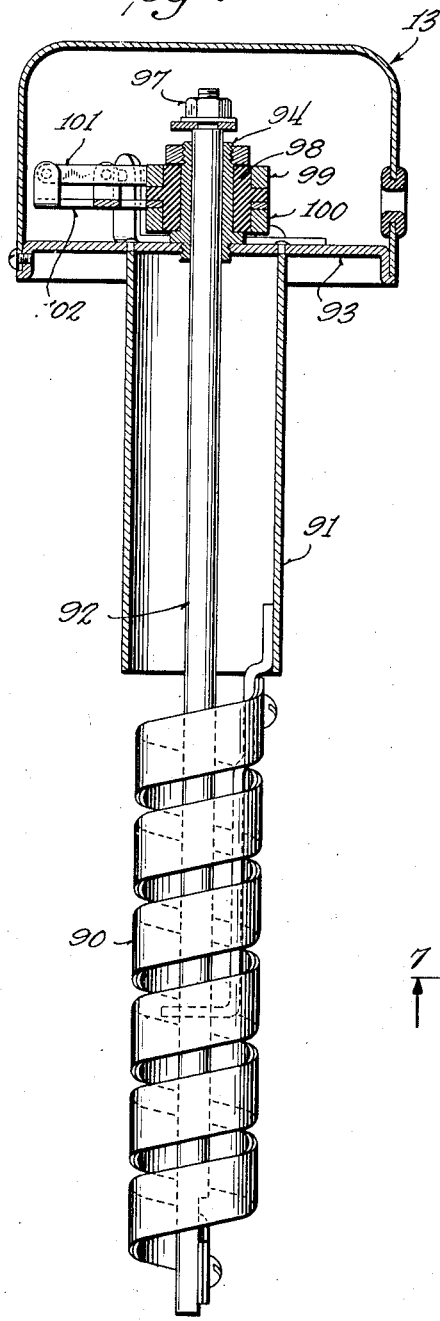
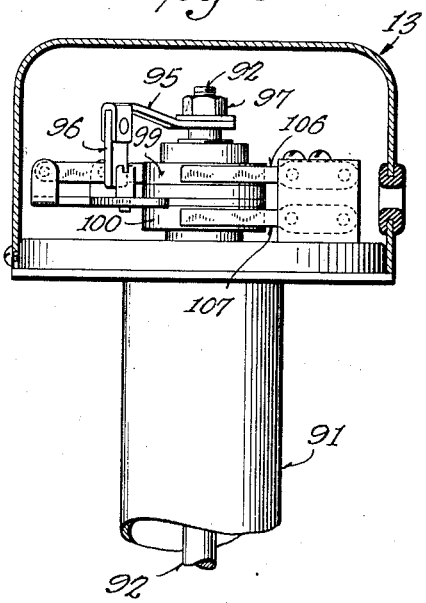
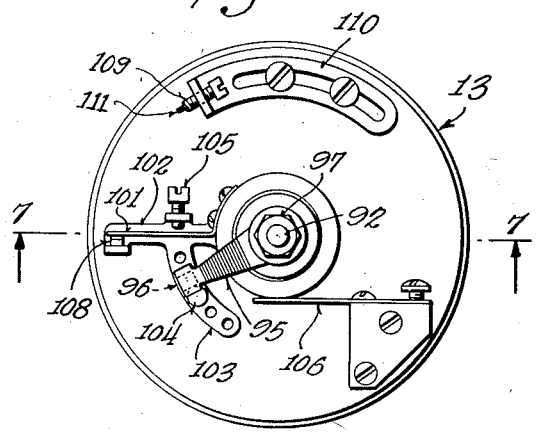
INVENTOR.
EDWIN A. JONES
BY
Austin R. Woolfolk
ATTORNEY.

Patented Aug. 31, 1943

2,328,280

UNITED STATES PATENT OFFICE 2,328,280

CONTROL MEANS AND SYSTEM OF CONTROL FOR HEATING DEVICES

Edwin A. Jones, Shorewood, Wis.

Application June 14, 1940, Serial No. 340,452

3 Claims. (Cl. 200—137)

This invention relates to control means and to a system of control for heating devices.

In heating devices such, for example, as furnaces, boilers or other heating systems for industrial installation in which a heating medium is heated from a burner, it often happens that there is a considerable overshoot of the temperature. In a house for instance, it frequently happens that the heating medium, is excessively heated before the control devices operate and even if the control devices are set to operate fairly promptly, nevertheless there is a large amount of heat stored in the massive furnace or boiler or other parts of the system and this frequently causes overshooting.

This invention overcomes the above noted defects, and objects of this invention are to provide control means and a system of control for heating devices which will prevent too rapid an increase in temperature of the heating device while still retaining the possibility of quick response of the heating device when needed.

In certain forms which this invention may take, a further object is to provide a control means and a system of control for heating means which will prevent too rapid a decrease in temperature of the heating device while still retaining the possibility of quick repsonse of the heating device.

In greater detail, further objects are to provide control means and a system of control for heating devices, for example furnaces, which are so made that the furnace is allowed to heat up in a step by step manner, the control device being placed at a point where it quickly responds to the heat from the burner, in which the control means reduces the flame at the burner and waits a predetermined period of time to see if a sufficient amount of heat has been furnished the house and thereafter again allows the burner to operate in the event sufficient heat has not been furnished the house, and thus in a step by step manner feels out, so to speak, the demand for heat, the control means being so constructed that it operates independently of the actual temperature of its thermally responsive parts but operates primarily in response to a sudden increase or decrease in temperature rather than responding to the actual temperature.

In heating a house for instance, it frequently happens that the demands on the system vary greatly. When the outside temperature is very low, the demands on the heating system are very different from those when the outside temperature is considerably higher. In addition to this, although the outside temperature may not vary, nevertheless the house may be heated comfortably when the sky is overcast but when the sun suddenly appears, the demands on the heating system may be considerably less.

This invention is designed to provide control means and a system of control, so made that they will take care of these widely varying conditions in the demand on the heating system, which will operate in a step by step manner, readjusting itself to a new level or new position or new demand, and will thereafter function to maintain the operation of the burner at a rate just sufficient to meet the then prevailing condition. In other words, further objects are to provide a control means and a system of control which will readjust itself and establish a new normal position about which the device will operate, one of the control means at least being independent of the actual temperature of its parts but being responsive to the rate of change of temperature of a medium which quickly responds to the heat from the burner.

In one form of the invention, a further object is to provide a thermally actuated time delay device for controlling a burner which is heated from the burner and which will allow the burner to operate for an interval of time and then will arrest the operation of the burner for an interval of time and will again allow the operation of the burner, and will repeat this cycle until a stable condition has been obtained and will thereby allow the heating device to store up and give out approximately predetermined quantities of heat at approximately predetermined intervals until a stable condition of the heating system has been obtained.

In a further form of the invention, further objects are to provide a thermally actuated device which is heated from the heat from the burner and which will arrest the operation of the burner by operating a control switch and will at the same time reset the control switch at a new high temperature point of operation and will thereafter allow the burner to operate again and will subsequently again operate the control switch at the higher temperature point and will continue this periodic operation until a stable condition is obtained in the heating system and which, upon final cooling, will reset the control switch at its initial low temperature point of operation.

Further objects of this invention are to provide a modulating regulator and associated apparatus which is so constructed that one ingredient of a combustible mixture is supplied to the burner initially at regulated pressure, and in which a time interval is provided between the time the ingredient is first supplied to the burner under regulated pressure and the time at which this supplied ingredient is further modulated in accordance with varying conditions, such as temperature, pressure, or other conditions produced by the burner.

This invention embodies certain features of my copending application Serial No. 337,133, filed May 25, 1940, for Control means for heating devices, and also has, therefore, the same objects as those set forth in my copending application.

Embodiments of the invention are shown in the accompanying drawings, in which:

Figure 1 is a diagrammatic view showing parts of the system with parts broken away.

Figure 2 is a view showing in section a modulating regulator and a time delay device and the manner in which they are associated with condition responsive means.

Figure 3 is a view of a further form of condition responsive means.

Figure 4 is a diagrammatic view showing the association of several parts of the system and the wiring therefor.

Figure 5 is a view, partly in section and partly broken away, of a condition responsive means which also constitutes a thermally actuated time delay means and which provides for the step by step action of the burner.

Figure 6 is a sectional view on the line 6—6 of Figure 5.

Figure 7 is a view, partly in section, showing a further form of condition responsive means which also provides for the step by step action of the burner. This figure corresponds approximately to a section on the line 7—7 of Figure 9.

Figure 8 is a fragmentary view, partly in section, of the upper portion of Figure 7.

Figure 9 is a top view of the structure shown in Figure 7 with the upper cap removed.

Referring to the drawings, particularly Figure 1, it will be seen that a hot air furnace has been illustrated and indicated by the reference character 1. It is provided with a cold air return duct structure indicated at 2 and with a plurality of hot air outlet pipes 3, one of which is shown in Figure 1. The burner means is illustrated as consisting of a plurality of burners 4 provided with pilots 5 and controlled by an on and off electric valve 6 and a modulating regulator 7. The modulating regulator and the on and off valve may be employed to control one ingredient of the combustible mixture, for instance either fuel or air. For example, if they are used to control the supply of fuel such as gas, they act directly as the control means of the fuel flow, whereas if they are used to control the flow of air, they will be used in conjunction with the ordinary zero pressure regulator which in turn controls the flow of gas. The zero pressure regulator has not been shown and for simplicity of description and illustration the on and off valve and modulating regulator have been shown as controlling the fuel flow to the burner.

The main supply pipe 8 leads directly to the modulating regulator, thence to the on and off valve 6, and from this point to the burner means.

A fluid actuated time delay device 9 hereinafter described in greater detail, acts as a transfer means for transferring the control of the modulating regulator so that the modulating regulator will first be controlled by the pressure on its discharge side and will after an interval of time be controlled by condition responsive means, all as will appear in detail hereinafter.

The modulating regulator may be controlled from any number of condition responsive means, such, for example, as the electric heat motor valve 10, the throttling gas thermostat 11 which is operated from the dome of the furnace 1 and acts as a limit control, or from any other condition responsive means. The electric valve 10 may be a heat motor valve as described in detail in my copending application Serial No. 337,134, filed May 25, 1940, for Modulating control system and automatic control means for a heating device, or it may be any other suitable form of electric valve.

This electric valve 10, as well as the on and off electric valve 6, is controlled from the room thermostat 12 and the electric valve 10 may be further controlled from the condition responsive means 13 which is illustrated as corresponding to the form shown in Figures 7, 8 and 9, or may correspond to the form shown in Figures 5 and 6. A small step-down transformer 14 has its primary connected to the house mains and its secondary supplies the electrical energy used by the electrically operated control devices.

It is believed that the operation of the apparatus will be best understood by describing in detail various groups of the units employed.

It will be seen that the gas supply pipe 8 communicates with the inlet chamber 15 of the modulating regulator indicated generally at 7, and that the modulating regulator controls communication between the inlet chamber 15 and the outlet chamber 16, such outlet chamber communicating by means of a discharge pipe 8' with the on and off electric valve 6 shown in Figure 1. A minimum flame by-pass duct 17 is provided which by-passes the modulating regulator and is controlled by means of a manually adjustable needle valve 18 to thereby set the apparatus for the particular amount of fuel required for minimum flame operation.

The inlet and outlet chambers 15 and 16 of the modulating regulator are separated by a transverse partition in which a valve seat 19 is provided and a valve 20 carried by the stem 21 of the modulating regulator cooperates with the valve seat to open or close the passage from the chamber 15 to the chamber 16 or to move to another intermediate position for modulating purposes.

The modulating regulator includes an upper portion consisting of a lower casing member 22 and an upper casing member 23 between which a diaphragm or movable wall 24 is positioned. The lower chamber 25 is the pressure chamber and the upper chamber 26 is in communication with the outside air or with any vent desired, the diaphragm 24 being moved by the relative difference in pressure between the two chambers 25 and 26.

A small sealing diaphragm 27 prevents communication between the inlet chamber 15 of the modulating regulator and the pressure chamber 25, and this diaphram may be clamped to the stem 21 of the modulating regulator and between the lower portion of the modulating regulator and the casing structure 22.

It is preferable to provide a disk or flange 28 on the valve stem 21 and to locate such disk or flange below the diaphragm 24, a larger disk 29 being positioned above the diaphragm and the two being held clamped to the diaphragm by means of the screw 30 or in any other suitable manner.

A compression spring 31 fits over the screw 30 and is thereby centered at its lower end. This compression spring extends upwardly into the neck portion 32 of the modulating regulator and is seated on the reduced end of an adjustable screw 33, the screw being locked by means of a lock nut and preferably its upper end being covered by a removable cap 34 threaded on the upper end of the neck 32. In this manner the regulated pressure at which the device first functions during the initial flow of the fuel and the maximum pressure at which the device can function at any time is adjustable to any predetermined value.

A duct 35 provides communication between the inlet chamber 15 and the pressure chamber 25 of the modulating regulator and this duct or passageway is for the purpose of supplying pressure fluid beneath the diaphragm 24.

An adjustment is provided by means of the needle valve 36 so that the rate at which this pressure fluid flows into the chamber 25 may be manually adjusted to any predetermined value. This adjustment determines the rate at which the pressure gas will be supplied. It also determines the differential through which the condition responsive means must move in order to cause the modulating regulator to function, as will be obvious hereinafter.

The pressure chamber 25 communicates freely with a bleed pipe 37 which extends to the inlet side or opening 38 of the time delay device 9. The pipe 37 also has a branch line indicated at 39 which passes to the condition responsive means 10 or to a plurality of condition responsive means.

For example, the pipe 40 leading from the condition responsive means 10 may be connected directly to the pipe 41 which in turn is connected to the pipes 42 and 43, the pipe 42 leading to one of the ports of the time delay means 9. or the pipe 40 may be connected to the pipe 40' of Figure 3 and the pipe 41 may be connected to the pipe 41'. These pipes lead to the condition responsive means or gas thermostat 11. In other words, the portions indicated at A—A and B—B of Figure 2 may be directly connected to each other or the portion A—A and B—B of Figure 2 may be respectively connected to the portions A—A and B—B of Figure 3, or any additional number of condition responsive means may be put in the line between the pipes 41 and 40. In the form illustrated in Figure 1, the condition responsive means 11 is used as a limit control.

The time delay device has its upper chamber 44 provided with a port 45 opening into the pipe 42 and from this by way of the pipe 43 communicating with the discharge chamber 16 of the modulating regulator 7.

It is to be understood that the lower chamber 25 below the diaphragm of the modulating regulator has a free and substantially unrestricted communication with the discharge chamber 16 of the modulating regulator when the time delay device establishes communication between the pipes 37 and 42 as will hereinafter be described.

The time delay device 9 consists essentially of a pair of casing members between which a diaphragm 46 is clamped, such diaphragm carrying a needle valve 47 and being preferably provided with plates on opposite sides of the diaphragm. These plates provide weight for the diaphragm so that the diaphragm is biased towards its lowest position. Obviously a spring could be employed if desired. The upper chamber 44, it will be noted, communicates freely with the pipe 42 as there is clearance around the stem 47 of the valve of this time delay device.

The time delay device is supplied with fluid pressure directly from the supply pipe 8 by way of the duct or passageway 48. The rate at which pressure fluid is supplied to the lower pressure chamber 49 of the time delay device is controlled by the manually adjustable needle valve 50 so that any desired time interval may be obtained.

It is to be noted in considering the time delay device, that the chambers 44 and 49 are each in reality pressure chambers and are respectively in communication with the inlet and outlet sides of the modulating regulator so that this time delay device in effect is an auxiliary valve responsive to difference in pressure on opposite sides of the modulating regulator when fluid flow is established through the modulating regulator.

When this fluid operated time delay device is in closed position, as shown in Figure 2, there is no communication through this time delay device provided between the chamber 25 and the discharge chamber 16 of the modulating regulator. Any communication that exists between these two points is provided through the condition responsive means.

The functioning and purpose of this construction is more fully described in my copending application Serial No. 337,133 hereinabove referred to. Suffice it to say, however, that the time delay device by-passes the condition responsive means and directly connects the lower pressure chamber 25 of the modulating regulator with the discharge side of such regulator by a free and substantially unrestricted passage so that when fuel is first supplied, the modulating regulator will move to regulated position as the communication between the discharge side or outlet side of the modulating regulator and the pressure chamber 25 is so much greater than the restricted high pressure passage through the duct 35.

When the on and off valve 6, see Figure 1, is closed, pressure will build up in the pressure chamber 25 of the modulating regulator and the modulating regulator will move to fully closed position. Also it is to be noted that equal pressure would be supplied on both sides of the diaphragm 46 of the fluid pressure time delay device 9 and the time delay device would move to open position as the weight of the diaphragm and its associated parts would be the only force acting on such diaphragm. Thereafter if the on and off valve 6 on the discharge side of the modulating regulator were open, the modulating regulator would immediately move to regulated position as its pressure chamber 25 would be in free and substantially unrestricted communication with the discharge chamber 16 of the modulating regulator. When flow occurs, the pressure on the upper side of the diaphragm of the fluid pressure time delay device 9 falls to that at the discharge side of the modulating regulator and the diaphragm 46 of the fluid pressure time delay device 9 rises as pressure fluid flows into the chamber 49 below its diaphragm, thus finally closing the valve of this time delay device 9.

It is apparent that by adjusting the needle valve 50 of the time delay device, the time interval may be varied. This time interval is the time between the establishing of flow through the modulating regulator and the time at which the modulating regulator comes under the control of the condition responsive means.

The valve 10 may be any type of electric valve. In the form shown it is a heat motor valve which normally stands open and closes when supplied with heat furnished by a small amount of electrical energy, as will hereinafter appear. The condition responsive means 11 may be a throttling gas thermostat which closes with increasing temperature.

It is apparent that with the parts shown in the position of Figure 2, that the burner is in operation and gas is flowing past the modulating valve and the fluid actuated time delay means is in its closed position. When electrical energy is supplied the heat motor valve 10, it will close and thus cut out the discharge of pressure fluid from the chamber 25 of the modulating regulator to the exhaust or discharge side 16 thereof. Further, it is apparent that if the condition responsive means 11 should close, the same result would be produced and in either case the modulating regulator would move to closed position. Thereafter the only fuel arriving at the burner would be that furnished by the minimum flame by-pass means 17.

It is to be understood that either of the thermally actuated devices shown in Figure 5 or 7 for providing the step by step operation of the burner may be employed. In the system shown in Figure 1, the form of device shown in Figure 7 is illustrated and in the system shown in Figure 4 the form shown in Figure 5 is illustrated.

It is believed that the description will be clearer if the form shown in Figure 5 is first described in connection with the system shown in Figure 4.

The position of the parts in Figure 4 is that which they occupy when the burner means is in operation. The electric on and off valve 6 is in open position and when in this position, it will be seen that the insulating plunger extending upwardly from the electric valve has moved the contact spring arm 51 upwardly into engagement with the stationary contact 52. The spring arm 51 is out of engagement with the stationary contact 52 when the electric valve 6 is in closed position. The spring arm is connected to one of the terminals of the solenoid 53 of the electric valve and is also connected to the terminal 54 of the device indicated generally at 55 in Figures 4 and 5 by means of the conductor 56. The other terminal of the solenoid 53 of the electric valve is connected by means of the conductor 57 with one side of the secondary of the step-down transformer 14. The stationary contact 52 is connected by means of the conductor 58 to one side of the electric valve 10. The other side of the electric valve 10 is connected by means of the conductor 59 with the bi-metallic arm 60 of the room thermostat 12. This room thermostat is provided with two spring arms 61 and 62 which cooperate with adjustable stationary contacts 63 and 64 respectively. The terminal or contact 63 is connected by means of the conductor 65 with the other side of the secondary of the transformer 14. The stationary contact 64 of the thermostat is connected by means of the conductor 66 with the terminal 67 of the device 55. The terminal 68 of the device 55 is connected to the conductor 59.

The member 55 constitutes a thermally actuated time delay device and causes the burner to operate in a step by step manner. It will now be described in detail.

The member 55 consists of a body portion 69 which rigidly carries a tube 70 which slidably carries a rod 71. The rod 71 is screwed at its outer end into the fitting 72 which fitting is screwed into or otherwise rigidly secured to the tube 70. The rod and tube are preferably made of exactly the same material and are at least made of materials having substantially the same coefficient of expansion. They may be both formed of copper, brass, stainless steel, hard rubber, or of other materials which have an appreciable coefficient of expansion. Preferably these members are formed of metal so that they may be placed in the flue pipe if desired.

It is also preferable to provide a plurality of holes 73 in the tube 70 which holes may be closed or uncovered by means of a split shield 74 which frictionally grips the tube 70 so that the amount of opening may be varied. This shield 70 may control either a few or all of the holes 73 in the tube 70. The body portion 69 also includes a casing member 75 which may be provided with an insulating closure member 76 on one side and a removable cover plate 77 on the other side thereof, as shown most clearly in Figure 6.

The insulating plate 76 carries the terminal members 67, 68 and 54 hereinbefore described. The terminal member 67 is provided with a stationary contact 78 and which may or may not be adjustable, and the terminal member 68 is provided with an adjustable stationary contact 79.

A pivot point 54' is electrically connected to the terminal 54 as shown in Figure 6. This pivot pin is shouldered and pivotally carries a lever formed of a metal portion 80 and a pair of spring arms 81 and 82 provided with movable contacts 83 and 84 at their outer or free ends. The lever 80 is urged in a clockwise direction as viewed in Figure 5 by means of a spring 85 secured thereto and bearing against an insulated pin 86. The lever 80 is provided with an insulating bushing 87 through which an adjustable screw 88 extends. This screw is provided with a reduced bearing head or point which bears against the inner end or free end of the rod 71 so that motion of the rod 71 relative to the pivot 54' causes the lever 80 to rock.

It is to be noted particularly that when the tube 70 and rod 71 are at substantially the same temperature, the parts are in the position shown in Figure 5 with the contacts 83 and 78 in engagement and with the contacts 79 and 84 separated. Under these conditions the conductor 56 is connected to the conductor 66 in Figure 4.

When the tube 70 is at a substantially higher temperature than the rod 71, the lever 80 rocks to the left and separates the contacts 78 and 83. When the tube is at a substantially lower temperature than the rod 71, the lever 80 is rocked to the right as viewed in Figure 5, thus causing the contact 84 to engage the contact 79, thus connecting the conductor 56 to the conductor 59, the contacts 83 and 78 remaining in engagement.

It is to be noted that irrespective of the actual temperature of the rod 71 and tube 70, that when they are substantially at the same temperature, the parts occupy the position shown in Figure 5. It is when there is a substantial difference in temperature between the rod and tube that the operation of the lever 80 occurs and it is moved one way or the other from its normal position as shown in Figure 5 as hereinabove described.

This device constitutes a thermally actuated time delay device. It is obvious that the number of holes 73 through the tube 70 determines to a certain extent the time interval between the heating or cooling of the tube 70 and the rod 71 before equilibrium is established. Obviously by adjusting the slide 74 the number of active holes may be increased or decreased and this time interval may, therefore, be varied. Other ways of varying this time interval are by varying the relative masses of the rod and tube. It also may be found in some instances that all of the holes 73 in the tube 70 could be omitted, in which case for the same relative mass of the parts a longer time interval would occur.

The operation of the apparatus is as follows: Assume that the on and off valve 6 is closed and that the room thermostat 12 is in a position to the right of that shown in Figure 4. Under these conditions, all of the electric circuits are deenergized. Also inasmuch as the on and off valve 6 is closed, it is apparent that the line pressure exists in the pipe 8' as well as in the pipe 8, see Figure 4.

Referring now to Figure 2, it is clear that the pressure in the discharge side 6 of the modulating regulator is transmitted to the upper chamber 44 of the fluid time delay device, and inasmuch as pressures are equal in the two chambers 44 and 49, both being line pressure, the diaphragm 46 is in its lowermost position as this device is biased towards open position due to the weight of the parts. The modulating regulator is in closed position as pressure will have built up in its chamber 25, thus moving the valve 20 to closed position. Also it is apparent that inasmuch as the rod 70 and tube 71, see Figure 5, are at the same temperature the conductor 56 leading to the terminal 54 is connected to the conductor 66. If now the room temperature drops, the room thermostat 12, see Figure 4, will move to the left and the first contact to be engaged will be the stationary contact 63. However, nothing happens as the spring arm 51 of the electric on and off valve 6 is out of engagement with the stationary contact 52 as the valve 6 is in closed position and there is no closed circuit connected to the secondary of the transformer 14.

Continued motion of the thermostat 12 to the left will cause the arm 62 to engage the stationary contact 64. The circuit will now be closed through the secondary of the transformer 14, the conductors 65, 66, 56, through the solenoid 53 of the electric valve and the conductor 57 back to the transformer 14. The electric valve will move to open position and the spring arm 51 will engage the stationary contact 52 and will remain in engagement therewith as long as the electric valve is open. Pressure in the discharge chamber 16 of the modulating regulator, see Figure 2, will fall and the pressure in the chamber 25 of the modulating regulator will be relieved through the pipes 37, 42, 43, back to the discharge side 16 of the modulating regulator, and this modulating regulator will therefore immediately move to its position for regulated pressure. The fluid time delay device 9 will commence to function as the pressure in its upper chamber 44 will have been relieved and pressure fluid will flow through the restricted passage 48.

A certain interval of time will elapse before the needle valve 47 moves to closed position and during this interval of time fuel will be supplied the burner at regulated pressure. When the needle valve 47 closes, it then cuts off direct communication between the chamber 25 of the modulating regulator and the discharge side 16 of such modulating regulator. Under these conditions the bleed from the chamber 25 of the modulating regulator is through the pipes 37, 39, 40, 40', 41', back to the pipe 43 and therefore to the discharge side 16 of the modulating regulator. The modulating regulator will, therefore, move to the position called for by the condition responsive means, all as described in greater detail in my copending application S. N. 337,133 hereinabove identified.

The temperature in the room will rise slightly and at the time that the spring arm 62 of the thermostat 12, see Figure 4, breaks contact with the stationary contact 64, the room temperature will be approximately at the desired temperature. Under these conditions, the electric valve 6 will not close for although the circuit is broken at the contact 64, nevertheless a circuit still exists which includes the heat motor valve 10, and though this heat valve offers a material amount of resistance to the flow of the electric current, nevertheless there is sufficient current flow to hold the electric valve 6 in open position, though there might not be enough current flow to initially open the valve.

When the contact is broken at the stationary contact 64, it is apparent that the current flows from the secondary of the transformer through the conductor 57, through the solenoid 53 of the electric valve, through the conductor 58, through the heat motor valve 10, through the conductor 59, back to the stationary contact 63 and from thence to the other side of the secondary of the transformer 14. The heat furnished by this current to the heat motor valve 10 causes such heat motor valve to close and consequently closes the bleed line from the chamber 23 of the modulating regulator, see Figure 2. The modulating regulator consequently moves to closed position and minimum flow obtains as the by-pass 17 of the modulating regulator will furnish such minimum flow.

If minimum flow is not sufficient to maintain the desired room temperature, the contact arm 62 will again engage the stationary contact 64 and thus short out the heat motor 10 and allow the modulating regulator to open.

In addition to the action hereinabove described, the thermally actuated time delay device 55 comes into play to prevent overshooting. This device is installed where it is acted upon very directly by the heat from the burner and much more quickly than the circulating medium, for instance the air furnished the room. It may be installed in the smoke pipe or flue 89 as shown for the member 13 in Figure 1. It is apparent that when the flue temperature rises rapidly, that the tube 70 will be heated before the temperature of the rod 71 is raised. Consequently the tube 70 will expand and cause separation of the contacts 83 and 78, see Figure 5.

Referring to Figure 4, it will be seen that this breaks connection between conductors 56 and 66. Consequently if the heat motor 10 had been shorted out by engagement between the arm 62 and the stationary contact 64, this heat motor will now be supplied with electrical energy and consequently with heat due to the opening of the contacts 78 and 83. This is apparent for the circuit now extends from the secondary of the transformer through the conductor 65, contact 63, arm 61, conductor 59, heat motor 10, conductor 58, electric valve 53, and conductor 57 back to the transformer 14. Consequently the heat motor will operate to cut off the leak from the chamber 25 of the modulating regulator, see Figure 2, and the modulating regulator will therefore move to closed position and the burner will operate with a minimum flame.

After an interval of time, the temperature of the rod 71 will approximate that of the tube 70 and the contacts 83 and 78 will again be in engagement as this is their normal position when the tube and rod are at substantially the same temperature, irrespective of their actual temperature. Under these conditions the heat motor will again be shorted out and consequently the bleed from the chamber 25 of the modulating regulator will again be open and the modulating regulator will consequently move to open position. This cycle of operations will continue. In other words, the device 55 will prevent too rapid heating of the furnace and will thus prevent overshooting. Instead, a certain amount of heat will be delivered from the burner to the furnace and if this amount is sufficient, the heat motor will be energized because the arm 62 of the room thermostat 12 will move away from the stationary contact 64, but if this amount of heat is not sufficient, the arm 62 will remain in engagement with the stationary contact 64 and when the rod 71 arrives at approximately the same temperature as the tube 70, the contacts 83 and 78 will again close, thus shorting out the heat motor and allowing the modulating regulator to again open. When the room temperature arrives at the desired point, the arm 62 of the room thermostat 12 moves away from the stationary contact 64 and the heat motor 10 operates to cause closing of the modulating regulator with consequent minimum flame operation of the burner.

It will be seen therefore that the device 55 provides a thermally actuated time delay device which causes the burner to operate in a step by step manner without any possible chance of overshooting.

It will be noted that each successive operation will permit a higher temperature to be reached as the rod 71 increases in temperature, until a condition is finally reached where the rod has approximated the maximum temperature which can be produced by the burner. Thereafter the device 55 will cease to function and the heat motor valve 10 will remain open until contacts 62 and 64 of the room thermostat open.

If the room temperature is at the correct value and the room thermostat 12 is in the position shown in Figure 4 with the arm 62 out of engagement with the contact 64, the device 55 will also function to prevent too rapid cooling of the furnace. If, for example, the demands on the furnace are severe during very cold weather, it may be desirable to prevent too rapid cooling of the furnace. Under these conditions the fact that the tube 70 will cool more rapidly than the rod 71 is utilized, and if this rate of cooling is sufficiently high, the contraction of the tube 70 will cause engagement to occur between the contacts 84 and 79, thus shorting out the heat motor, as is apparent from an inspection of Figure 4, as it will be seen from such figure that the conductor 59 will then be directly connected to conductors 56, thereby shorting out the heat motor and causing the heat motor to open its valve and thereby cause the modulating regulator to open temporarily. Thus the cooling of the furnace is caused to take place in a step by step manner so that an excessively rapid rate of cooling is prevented.

The device shown in Figure 5 has the double function of preventing too rapid heating and also preventing too rapid cooling. It is not necessary to use both of these modes of functioning of the device shown in Figure 5 as the contacts 79 and 84 could be dispensed with if it was not desired to have this check on the rate of cooling.

It is apparent that the adjusting of the contact 72 and of the screw 88 will determine the temperature difference required to operate the control member. It is to be noted that the blade 81 is flexible to allow for a differential.

In the form shown in Figures 7, 8 and 9, a device has been illustrated which will not prevent too rapid cooling but which will prevent too rapid heating. In this form of the invention, a spirally formed thermostatic member or bi-metallic strip 90 is provided and is rigidly secured at one end to the rigid sleeve 91 and at its other end to the rod 92 so that when the spiral 90 is heated, it tends to rotate the rod in a clockwise direction as viewed in Figure 9. The sleeve 91 is rigid with a body portion 93 and the body portion 93 carries a bushing or bearing 94 which provides a bearing for the rod 92. The outer end of the rod 92 is provided with a laterally extending arm 95 provided with an insulating finger or pusher member 96. The arm 95 may be adjusted on the rod to the desired position and thereafter may be locked in place by means of the nut 97 threaded on a reduced extension of the rod 92.

A switch carrier is provided in the form of an insulating hub like member 98 revolubly carried outside of the bushing 94. This insulating member carries a pair of slip rings 99 and 100 which are respectively connected to a spring contact arm or switch arm 101 and to a rigid member or arm 102. The arm 102 has an arcuate extension 103 provided with a plurality of apertures into any one of which a pin 104 may be positioned. Also it is preferable to provide an adjustable stop screw 105 on the arm 102. A pair of brushes 106 and 107 bear upon the slip rings 99 and 100, as will be seen from Figure 8.

The spring switch arm 101 normally engages the relatively stationary contact 108 carried by the metallic arm 102 and thus normally there is a direct connection between the slip rings 99 and 100 and consequently between the brushes 106 and 107. Thus the system shown in Figure 9 serves to short out the heat motor valve 10 and to cause the modulating regulator to open, as previously described. However, as the spiral 90 heats up, it rocks the arm 95 in a clockwise direction as viewed in Figure 9 and moves the spring switch arm 101 away from the relatively stationary contact 108, thus allowing electrical energy to be supplied the heat motor 10 as the heat motor is not now shorted out. At the same time it is apparent that the arm 95 continues a slightly greater distance in a clockwise direction even after opening the switch and consequently moves the spring arm 101 into engagement with the adjusting screw 105 and thus rocks the switch carrier arm 102 a slight distance in a clockwise direction as viewed in Figure 9, thus setting the switch for operation at a higher temperature level. When there is a slight cooling in the smoke pipe or flue, the spiral 90 cools slightly and rocks the arm 95 a slight distance in a counterclockwise direction as viewed in Figure 9, thus allowing the switch arm 101 to engage the contact 108 and short out the heat motor. This causes the modulating regulator to open as previously described, and the cycle of operation continues until the desired temperature is arrived at, at which time the heat motor 10 will be shorted out by the operation of the room thermostat 12 in the manner previously described.

On the other hand, if the room thermostat is not satisfied and does not short out the heat motor, this periodic operation of the burner will continue until the switch carrier is moved to a position where the spring arm 101 engages the adjustable stop screw 109 fixedly carried by the adjustable plate 110.

It is preferable to provide the stop screw 109 with an insulating projecting portion 111 so that there will be no electrical connection between any part of the switch and the other parts of the apparatus. When the switch arm 101 engages the stop screw 109, the switch arm 101 is held in engagement with the contact 108, thus keeping the heat motor valve 10 shorted out and allowing full operation of the modulating regulator.

The system is usually so adjusted that the room thermostat is satisfied prior to the final limit position that the parts shown in Figure 9 may take, except in extremely cold weather or when bringing the house up to the correct temperature in the morning. Whenever the room thermostat 12 opens, all of the electrical circuits are dead and the on and off valve 6 closes. Upon cooling of the furnace the spiral thermostatic member 90, see Figure 7, rotates the rod 92 and consequently the switch arm 95 in a counter-clockwise direction. This causes the finger 96 to engage the pin 104 and to move the switch back to its initial or starting position.

The conductors 59', 65' and 66' of Figure 1 correspond to the conductors 59, 65 and 66 of Figure 4.

It will be seen that this invention provides a step by step operation of the furnace and prevents overshooting. It will also be seen that very simple forms of devices have been provided for securing this step by step operation.

It is to be particularly noted that although the devices shown in Figures 5 and 7 have been described in connection with a gas-fired furnace, that they are equally applicable to the control of other types of furnaces and may be used for the control of stokers if desired. Under these conditions the stoker would be started and stopped in a step by step manner so as to lessen the chance of overshooting.

It is to be noted that while in Figure 5 a rod and tube construction have been shown in which the rod is more or less shielded by the tube, thus securing the additional effect due to shielding, that nevertheless two members could be employed neither one of which necessarily shielded the other but which were of different mass in relation to their exposed surface.

It will be seen further that the system as a whole provided for a very close control of the temperature of the medium heated by the burner and prevents overshooting, and also in certain forms prevents too rapid a cooling. It will be seen further that the system also provides for the initial supply of fuel to the burner under regulated pressure and thereafter places the control of this fuel under the control of the modulating regulator as described and claimed in my copending application Serial No. 337,133 hereinabove referred to.

It will be seen further that all of the parts of this system are relatively simple and are easy to install and adjust and are relatively inexpensive to manufacture.

Although this invention has been described in considerable detail, it is to be understood that such description is intended as illustrative rather than limiting, as the invention may be variously embodied and is to be interpreted as claimed.

I claim:

1. A thermally actuated time delay control device actuated by a medium subject to temperature fluctuations comprising two members which have approximately the same expansion due to change in temperature, control means actuated by the difference in expansion when said members are at substantially different temperatures and occupying a normal position when said members are at substantially the same temperature irrespective of the actual temperature of said members, and means to adjust the relative rate of heating and cooling of said members.

2. In a thermal device of the kind described, two members, said members having substantially the same coefficient of expansion whereby the same lineal expansion in a given direction obtains, and adjustable means for shielding one of said members from external influences.

3. In a thermal device of the kind described, a tube, an elongated member within the tube, said tube and member being connected at one end and having substantially the same coefficient of expansion, openings in the tube to permit passage of an affecting medium to the member, and adjustable means to close selected openings to determine the expansion relationship of the tube and member, whereby the time interval between the tube and member reaching the same degree of expansion or contraction for a given new temperature is controlled.

EDWIN A. JONES.